R. BROWN.
Harvester.
No. 1,769.
Reissued Sept. 20, 1864.
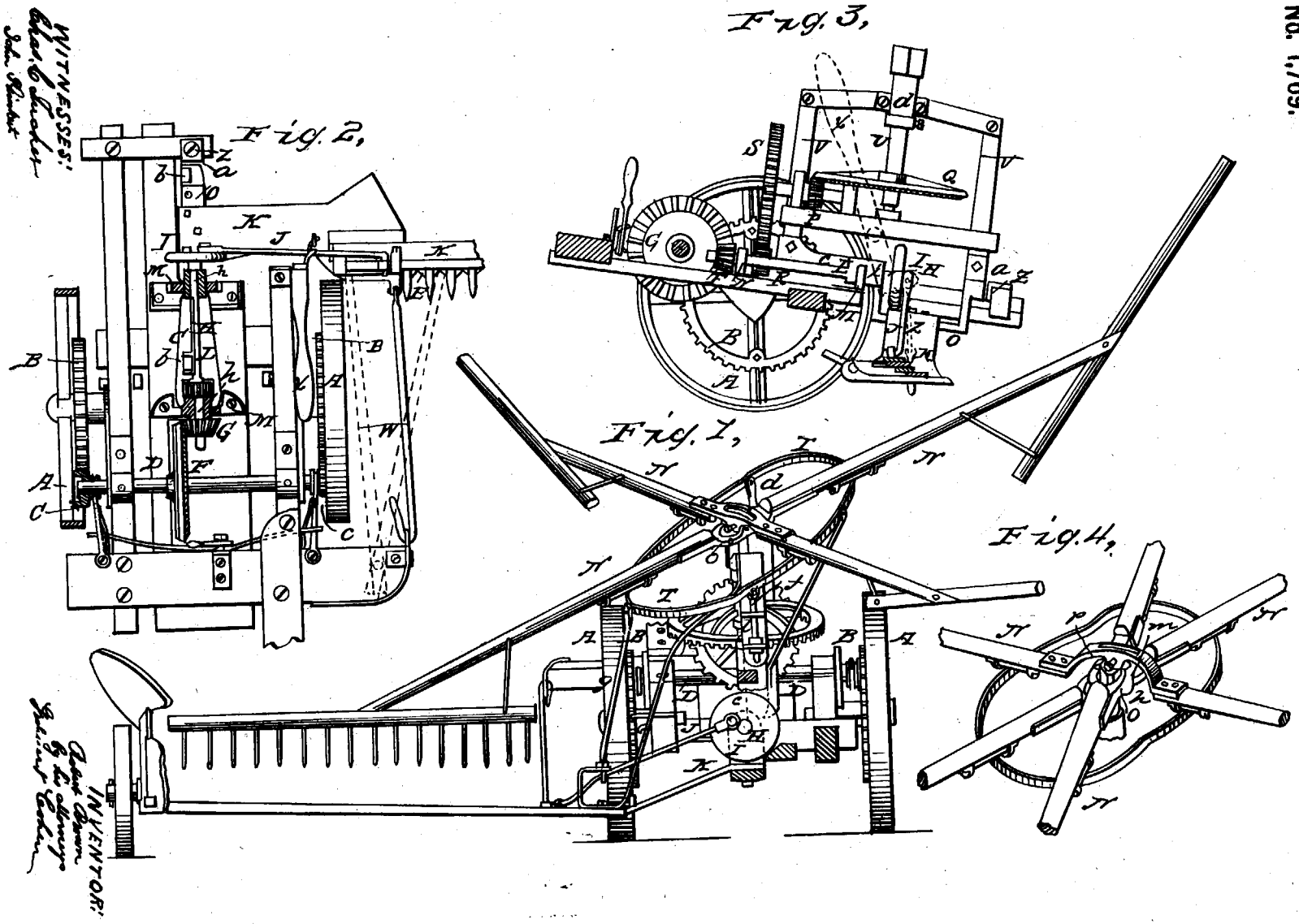
N. PETERS, Photo-Lithographer, Washington, D. C.

UNITED STATES PATENT OFFICE.

ROBERT BROWN, OF NEWARK, OHIO.

IMPROVEMENT IN HARVESTERS.

Specification forming part of Letters Patent No. 32,556, dated June 18, 1861; Reissue No. 1,769, dated September 20, 1864.

*To all whom it may concern:*

Be it known that I, ROBERT BROWN, formerly of the city and county of Frederick, in the State of Maryland, but now residing at Newark, in the county of Licking and State of Ohio, have invented certain new and useful Improvements in Harvesting-Machines; and I do hereby declare that the following is a full, clear, and exact description of the same, reference being had to the accompanying drawings, in which—

Figure 1 represents a rear view of the said harvesting-machine, showing the rake-frame partially in section to show its attachment to the finger-beam. Fig. 2 represents a top view of the machine as adapted to mowing. Fig. 3 represents a section through the line 1 1, Fig. 2, showing the rake-frame and rake-shaft. Fig. 4 represents a perspective view, exhibiting the manner of attaching an additional number of rake-arms.

The nature of my invention consists in rigidly connecting the rake-frame of a harvesting-machine with the hinged finger-beam so that the rake can rise and descend with said finger-beam and platform when the machine passes over uneven ground; also, in an improved manner of mounting the rake; also, in an improved combination of devices for attaching the reel or rake to adapt it for any desired number of arms.

A A are the driving-wheels, carrying cogged rings B, which gear with pinions C, journaled loosely upon the shaft D, so as to impart motion thereto only when the machine is moving forward and when placed in gear. Reciprocating motion is thence communicated to the cutter E through the medium of bevel-gears F G, shaft H, crank-wheel I, and connecting-rod J in the customary manner.

L represents a hollow or divided shaft whose journals *l l* and *a* are respectively supported by the journal-boxes M M and Z, Figs. 2 and 3, and which freely swing on its journals. It has a crank-shaped part, O, to which the finger-beam K of the machine is bolted, and which finger-beam can thus freely turn, with the shaft L as its fulcrum, to rise and descend when the machine passes over uneven ground. The hollow shaft L has also suitable inner bearings, which serve as journal-boxes for the shaft H of the crank-wheel I. The said hollow shaft L is also provided with suitable flanges, *b b c*, for the reception and support of the rake-frame V of the machine, as shown in Figs. 1, 2, and 3.

The vertical shaft U of the rake is journaled at *d* to the rake-frame V, projecting upward therefrom.

The arms N of the rake or reel rest upon a ring, T, and are rotated through the medium of the pinion R, spur-wheel S, pinion P, crown-wheel Q, and shaft U in the customary manner.

The ring T, which supports the rake-arms in their movements, is supported by the rods *f f g i*, to which it is pivoted at *e e d d*. The rods *f* pass through suitable flanges, Z, in the rake-frame, and their height can be adjusted by means of the adjusting screw-nuts *y*. The lower end of the rods *g* is supported on the brace *x*, whose upper end is secured to the rake-frame, and whose lower end is bolted to the finger-beam. The length of the rod *g* can also be adjusted by means of screw-nuts *u*, and thus the inclination of the ring T can be adjusted with the greatest accuracy, so as to cause rake-arms to perform their proper motion over the platform.

From the above it will be seen that the frame which supports the rake has a rigid connection with the hinged finger-beam of the machine, and consequently the rake itself will participate in all movements of said finger-beam when the machine passes over uneven ground, that the relative positions of the rake-shaft and rake-arms to the finger-beam and platform are not changed by the swinging motion of the latter, and that thus the perfect operation of the rake will not be interrupted or deranged in any manner when the machine passes over uneven ground.

When a four-armed reel is employed one arm is provided with a rake-head, as shown in Fig. 1. In this arrangement each pair of arms is mounted upon a metal ring, *o*, encircling the shaft U, and is secured thereto by a bolt, as represented in Fig. 1. When six arms are required the ring *o* of the center pair is constructed with bolt-holes 2, set obliquely to the arms, and a bridge, *m*, perforated for the attachment of an arched yoke, *p*, to which the upper pair of arms is secured, as shown in Fig. 4. By this means a reel of either two, four, or six arms may be used, the arms in either case being equidistant and adapted to revolve in one plane. In a six-armed reel two are usually provided with rake-heads.

The construction of the finger-beam is exhibited in Fig. 3.

*q* is a rabbet in front on the under side of the bar to afford secure attachment and support for the fingers *r*.

*s* is a rabbet at the rear and on the upper side of the bar to receive the platform of the machine without causing it to project above the top of the bar, and (when the platform is removed) to allow the grass to fall with greater freedom.

W is the gatherer. (Represented in red lines in Fig. 2.) It consists of a bar pivoted at *w* to the frame of the machine, and is adjustable at any desired angle to deflect the grain toward the cutters.

X represents a lever fulcrumed at *x* to the frame of the machine, and connected with the finger-beam by a link, Z.

The other parts of the machine not being embraced in my invention their description is dispensed with.

Having thus fully described the nature of my invention, what I claim herein as new, and desire to secure by Letters Patent, is—

1. Rigidly connecting the rake-frame, which is supported on the main frame of the machine, with the hinged finger-beam in such a manner that the rake-shaft does not change its relative position to said finger-beam when the latter is raised or lowered in passing over uneven ground, substantially in the manner and for the purposes herein set forth.

2. Securing both the finger-bar and rake-frame to a hollow shaft, L, the journals *l* of which run in bearings M in the main frame, and themselves constitute bearings for the journals *h* of the crank-shaft, as herein shown and described, and for the purposes set forth.

3. The reel attachments *o m p*, constructed, combined, and arranged in the manner specified, to enable the attachment of any desired number of arms.

ROBERT BROWN.

Witnesses:
WALDO TAYLOR,
A. M. HUNTER.